United States Patent [19]

Robertson

[11] 4,080,988

[45] Mar. 28, 1978

[54] COMBINATION EMPLOYING CONTROLLED FLOW CHECK VALVE

[75] Inventor: Cecil C. Robertson, Fort Worth, Tex.

[73] Assignee: Malor Manufacturing, Inc., Fort Worth, Tex.

[21] Appl. No.: 723,971

[22] Filed: Sep. 20, 1976

[51] Int. Cl.² ............................................. F16K 15/02
[52] U.S. Cl. ............................................... 137/513.3
[58] Field of Search ..................................... 137/513.3

[56] References Cited

U.S. PATENT DOCUMENTS

| 1,844,613 | 2/1932 | Thompson | 137/513.3 X |
| 3,592,223 | 7/1971 | Reese | 137/513.3 X |
| 3,603,344 | 9/1971 | Stampfli | 137/513.3 |

FOREIGN PATENT DOCUMENTS

| 1,060,822 | 7/1959 | Germany | 137/513.3 |

*Primary Examiner*—William R. Cline

*Attorney, Agent, or Firm*—Wofford, Felsman, Fails & Zobal

[57] ABSTRACT

In a combination including a communications conduit containing pressurized fluid and a smaller conduit sealingly connected therewith for testing the pressure of the fluid therewithin, an improvement characterized by a controlled flow check valve connected serially with the smaller conduit and sealingly with the communications conduit, the controlled flow check valve having a conventional poppet and seat means for allowing full flow in one direction for pressurizing and blocking reverse flow for preventing depressurizing; and a controlled flow bypass structure allowing a controlled reverse flow sufficient to permit testing of pressure but insufficient to bleed the pressurized fluid from the communication conduit in a short time. Also disclosed are the specific preferred structural embodiments that are economical and readily manufactured in contrast to elaborate apparatus enabling accomplishing a similar result in the prior art.

6 Claims, 4 Drawing Figures

U.S. Patent    March 28, 1978    4,080,988
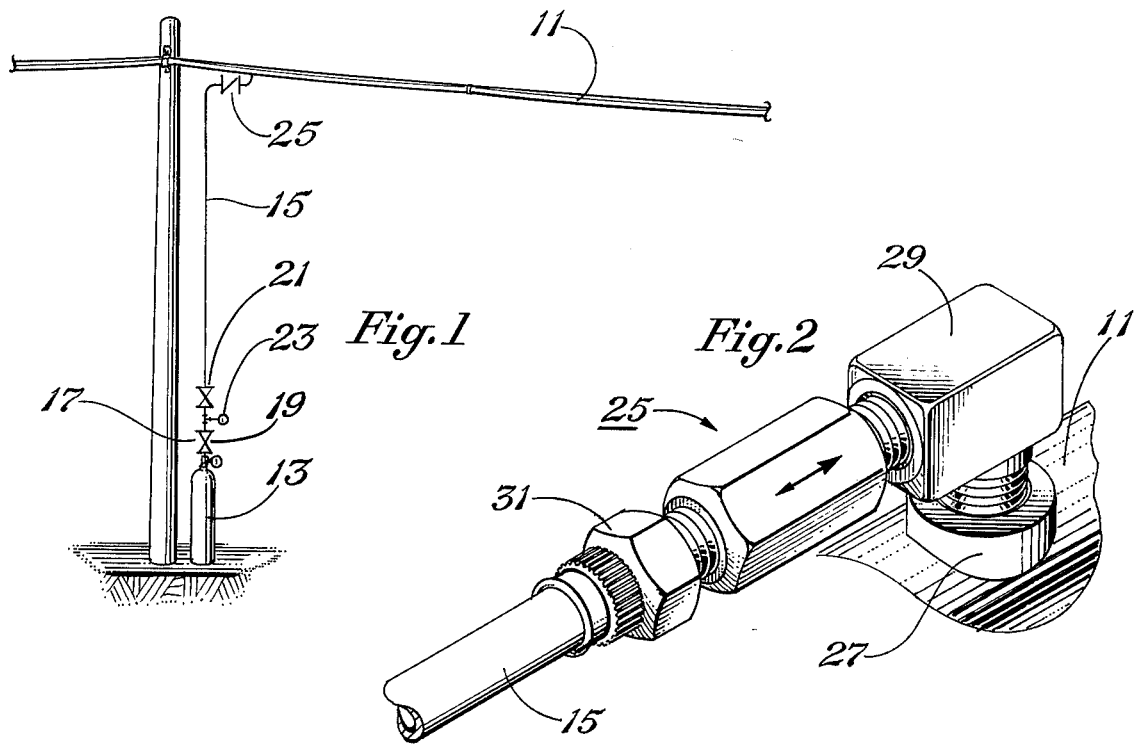
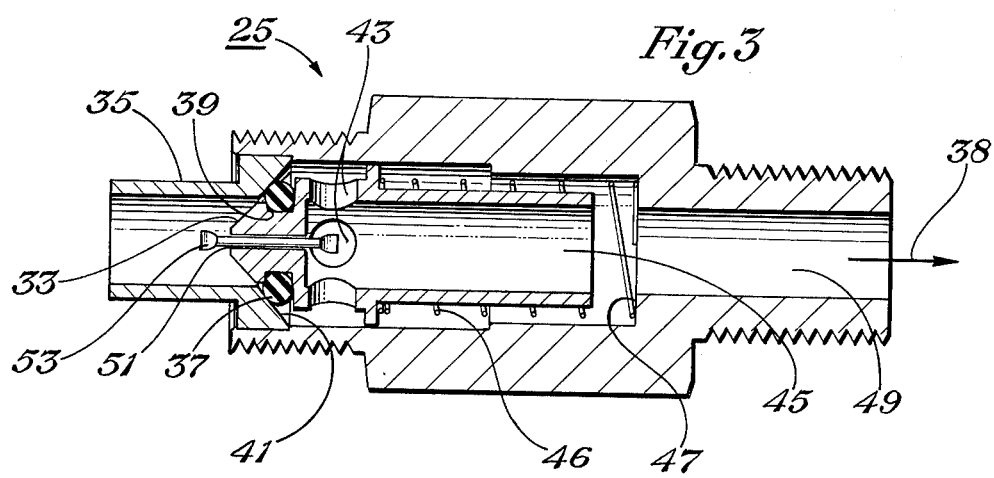
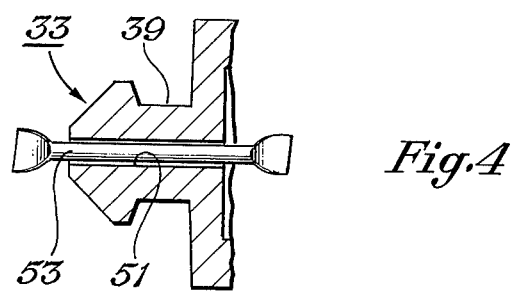

COMBINATION EMPLOYING CONTROLLED FLOW CHECK VALVE

BACKGROUND OF THE INVENTION

1. Field of the Invention

This invention relates to combinations employing pressurized communications conduit and a system for checking the pressure of the pressurized fluid therewithin. More particularly, this invention relates to such a communication system for checking the pressurized fluid within communications conduit and employing a device that will allow full pressurizing flow, yet block full reverse flow while still allowing a minute reverse flow that is still enough to check the pressure.

2. Description of the Prior Art

A wide variety of prior art combinations have been employed to allow pressurizing a communications conduit yet provide means for checking the pressure therewithin at a point that is more readily accessible from the surface of the earth. The pressurized conduit may be elevated on poles or the like, or it may be buried beneath the surface of the earth. To enable checking the pressure within the conduit, a check point, such as a smaller conduit and valve will be in communciation with the larger communication conduit. Not infrequently, the smaller conduit will be torn away, broken, or otherwise develop leaks and cause back flow that would drain the pressurized fluid from the communications conduit. Conventions check valves close to the communications conduit could prevent back flow but interferred with testing the pressure. To solve both problems, the prior art has seen relatively complex, expensive apparatus employed. Broadly, for example, there have been safety devices for effecting non return flow of oil in a transformer; electronically openable valves could be opened responsive to a signal transmitted by the repairman on expensive pieces of electronic equipment; employing two smaller conduits to the surface with a pumping means to pressurize via one line to open the other for checking the pressure; and devices that open responsive to pressure supplied from the free end of the smaller conduit; and other similar devices. As can be seen, the prior art devices have been objectionable that they were expensive, required a second piece of apparatus to be carried by the repairman in addition to the pressure testing device, required pressurizing of the lines such that an inaccurate pressure reading was obtained, required a plurality of conduits or the like.

SUMMARY OF THE INVENTION

Accordingly, it is an object of this invention to provide for checking the pressure within a communications conduit a combination that is economical, and does not drain off the pressurized fluid from the communication conduit, yet allows checking the pressure without expensive, complicated equipment and without distorting the pressure in the communications conduit by having to pump up a lead-in conduit.

More specifically, it is an object of this invention to provide a combination that includes a controlled flow check valve that allows full flow for pressurization of the communications conduit but blocks full back flow, while allowing a trickle reverse flow sufficient to check pressure by way of a small closed conduit and test means.

These and other objects will become apparent from the descriptive matter hereinafter, particularly when taken in conjunction with the appended drawings.

In accordance with this invention there is provided a combination that includes a communication conduit containing a pressurized fluid; a smaller conduit sealingly connected with the communications conduit and having at an accessible end, at least a means for connecting with a test device for testing the pressure; and an improvement characterized by a controlled flow check valve sealingly interposed in serial communication with the smaller conduit adjacent the communications conduit so as to allow full forward flow for pressurizing the communications conduit, to block reverse full flow, and to allow a small trickle reverse flow for testing the pressure, the small trickle flow being insufficient to bleed the pressurized fluid from the communications conduit in a short time.

Specifically, the controlled flow check valve includes a poppet and seat means for allowing the full flow in one direction and for blocking the full reverse flow; and a controlled flow bypass means allowing the controlled trickle reverse flow sufficient to permit testing but insufficient to bleed off the pressure in a short time. The bypass means includes a passageway having smooth interior walls and a bore of a first diameter and an insert closely fitted within the bore of the passageway; the insert so nearly completely filling the bore that less than 0.001 inch annular clearance is available for the reverse flow. The insert provides a clearance of at least 0.0001 inch for the trickle reverse flow.

BRIEF DESCRIPTION OF THE DRAWINGS

FIG. 1 is a partial side elevational view of a simplified embodiment of this invention;

FIG. 2 is an isometric view of the controlled flow check valve of FIG. 1 in one of its installed positions;

FIG. 3 is a partial cross-sectional view of the interior of the controlled flow check valve; and FIG. 4 is a partial cross-sectional view of the bypass means in the poppet of the check valve.

DESCRIPTION OF PREFERRED EMBODIMENT(S)

As is well recognized, telephone cable and the like is frequently pressurized with the fluid, such as dry nitrogen gas, to prevent invasion of water and problems with shorting of conductors and electrical signals. There is an ever increasing number of such pressurized communication conduit below the level of the ground where the invasion of moisture problem is even more pronounced. Referring to FIG. 1, however, there is illustrated an elevated communications conduit 11, such as a telephone conduit, containing a pressurized fluid, such as a nitrogen. For example, nitrogen may be supplied to the communications conduit from one or more pressurized containers 13 via smaller conduit means 15. Conduit means 15 may be connected to the container 13 by suitable manifold 17. The conventional manifold 17 will ordinarily include one or more valves 19 and 21 with a pressure sensing means, such as gauges 23. It is convenient to have at least means adapted for being connected with a pressure test means at the lower end of the conduit 15 to facilitate the testing of the pressure in communications conduit 11 without having to climb the pole or the like. For example, the gauge 23 is left in place with a lower valve 19 closed for showing the pressure directly. Frequently, a quick connect fitting will be provided upstream of the valve so the repairmen can connect his accurate test means, open the valve and measure the pressure. The installation of the nitrogen container 13 may be temporary. In such temporary installations, the small conduit 15 will be light weight. Consequently, it can be readily damaged by vandalism or the like. If the conduit were open or a leak developed, the main communications conduit 11 could have its pressurized fluid drained rapidly therefrom so as to be susceptible to the invasion of water in a short time, as little as a few minutes.

To prevent such drainage and depressurization, there is provided a controlled flow check valve 25 that is connected with the top end of the small conduit 15 and connected sealingly in communication with the communications conduit 11. In particular, the communications conduit 11 may comprise pressurized cable 11, FIG. 2, having a threaded nipple 27 affixed thereinto, as by saddle clamp, adhesion, solder or the like. Ordinarily, the communication conduit, or pressurized cable 11, will be adapted to withstand pressures from a few ounces per square inch to as much as 10 to 12 pounds per square inch (psi). Consequently, the fittings with which the remainder of the discussion is concerned should be adapted to withstand at least an equal amount of pressure. As illustrated, an ell 29 is sealingly screwed into the fitting 27, as by using conventional thread sealant, such as lead oxide, thermoplastic tape, or the like. A controlled flow check valve 25 is sealingly affixed, as by the illustrated threaded connection to the other end of the ell 29. The controlled flow check valve 25 is affixed, as by threaded connectors 31 with the smaller conduit 15. Thus, the pressure can be read by the gauge 23. Of course, other gauges may be employed to read the higher pressure on the nitrogen cylinder 13 or the like as desired; ordinarily, as part of a pressure regulator.

Referring to FIG. 3, the controlled flow check valve 25 has a poppet 33 and a seat means 35 for allowing full flow in one direction, indicated by the arrow 38. For blocking full reverse flow, the exterior, frusto-conical surface of the poppet has an o-ring seal 37 emplaced within a circumferential groove 39 such that the o-ring sealingly engages the receiving inverted frusto-conical section 41 of the seat means 35. A plurality of apertures 43 open into a central bore 45 to allow the full flow in the forward direction. Yet when the reverse flow is attempted, the o-ring 37 sealingly engages the section 41 of the seat 35 to block such full reverse flow. The poppet is biased toward engagement with the seat by a light weight biasing means, such as spring 46. Annular shoulders such as shoulder 47 are provided to seat the spring and to prevent the poppet from being moved out of the interior of the main bore 49 of the controlled flow check valve 25.

To provide a sufficient back flow adequate to test the pressure, the poppet 33, FIGS. 3 and 4, has a centrally disposed first passageway 51 that is disposed interiorly of the sealing o-ring 37 and its groove 39. The diameter, or bore, of the first passageway is carefully controlled to close tolerances for controlled flow therethrough. As illustrated, the first passageway 51 is formed by drilling with a suitable bit; for example, a number 55 bit. Of course, the diameter of the passageway will be designed for the fluid being employed in the pressurized conduit. A larger passageway can be employed where the fluid is a liquid, such as oil or the like, as for cooling transformers. Ordinarily, however, it has been found that the illustrated bore is adequate for gaseous fluids such as nitrogen. It is apparent, of course, that smaller passageways can be employed if helium or smaller molecule type gases are employed.

In any event, the main portion of the bore of the passageway 51 is largely plugged by a suitable insert 53 inserted within the bore of the first passageway 51. As illustrated, the insert 53 is substantially cylindrical copper wire whose outer dimensions, or outside diameter, closely approximates the first diameter of the first passageway 51 to prevent a backflow of sufficient magnitude to drain the pressurized conduit rapidly or within a short time. The illustrated insert 53 is number 16 copper wire with ends that are flattened for retention in place. It has been found that for gaseous fluids and with the delineated bore the annular clearance between the insert 53 and the smooth walls of the passageway 51 must be at least 0.0001 inch in order to obtain adequate reverse flow for measuring the pressure within a reasonable time. On the other hand the annular clearance must be less than 0.001 inch or the rate of flow will be large enough to allow depressurization too rapidly in the gaseous fluid, such as nitrogen or compressed air, in the pressurized communications conduit 11. It has been found adequate to employ the illustrated number 16 copper wire and the number 55 drilled passageway to effect a differential annular clearance in the range of 0.0005–0.0007 inch clearance.

To convert these tolerances into flow rates, it has been found that with 7 to 12 pounds per square inch gauge in the pressurized conduit, the trickle reverse flow should be at least in the range 0.1–0.9 cubic feet per hour (cfh); preferably, about 0.5 cubic feet per hour. The controlled flow check valve is designed to allow flow of about 7 cubic feet per minute, or 420 cubic feet per hour, in the forward direction, under the described pressurizing conditions. As will be readily apparent to one skilled in the art, the clearance can be descreased if smaller molecule gases are employed, because of the increased mobility of the smaller molecules. The widely accepted use of the nitrogen gas, makes the illustrated and described embodiment preferable from a commercial point of view.

In operation, the controlled flow check valve 25 is affixed in fluid communications and sealingly connected with communications conduit 11, as illustrated and described herein. Thereafter, the small conduit 15 is connected therewith so as to provide at least a means, such as valve 21, for connection with a pressure test device. Preferably, the pressure test device may comprise a gauge 23 that is in fluid communication with the interior of the communications conduit with flow blocked, as by valve 19. Of course, if desired, the manifold 17 may be removed after the communications conduit in pressurized and valve 21 closed. If desired, a quick connect fitting may be employed adjacent the valve 21 in the lower end of the small conduit 15. With this arrangement, the lineman need only insert his bayonet probe on a pressure gauge or the like to rapidly test pressure, as for verifying that there are no significant leaks.

While the illustrated embodiment has been shown with the body of the controlled flow check valve having its longitudinal axis substantially parallel with the longitudinal axis of the communications conduit 11, it is apparent that the fluid end of the check valve may be disposed in a substantially normal, or perpendicular installation, as by simply screwing into the nipple 27.

A wide variety of other piping and tubing connections may be employed as necessary for the environment, whether it be in the air or subterranean.

In the illustrated embodiment, the components of the controlled flow check valve or those ordinarily employed in this art may comprise metal; such as brass, or other copper based alloys, steel or aluminum; plastic or the like. If desired, of course, a plastic or other materials could be employed for some of the components, such as the seats. The conduits are those normally employed in this art.

From the foregoing, it can be seen that this invention provides a combination that achieves the objects delineated hereinbefore and obviates the disadvantages of the prior art approaches.

Although the invention has been described with a certain degree of particularly, it is understood that the present disclosure is made only by way of example and that numerous changes in the details of construction and the combination and arrangement of parts may be resorted to without departing from the spirit and the scope of the invention.

What is claimed is:

1. In a combination including:
   a. a communication conduit having a pressurized gaseous fluid therewithin; and
   b. a smaller conduit sealingly connected with and communicating with the interior of said communication conduit; said smaller conduit having at least means for connecting with a test device for testing the pressure of said fluid; the improvement comprising:
   c. a controlled flow check valve connected serially and sealingly with said smaller conduit and sealingly with and near said communications conduit; said controlled flow check valve including:
      i. full flow passages with a poppet and seat means for allowing full flow in one direction and adapted for blocking reverse flow through the full flow passages; and
      ii. a controlled flow bypass means allowing a controlled trickle reverse flow sufficient to permit testing but insufficient to bleed said pressurized fluid from said communication conduit in a short time; said bypass means comprising:
   I. a passageway having smooth interior walls and a bore of a first diameter;
   II. an insert closely fitted within said bore of said passageway; said insert having a second diameter so nearly completely filling said first diameter of said bore that less than 0.001 inch annular clearance is available for said reverse flow, and providing a clearance of at least 0.0001 inch for said reverse flow;

such that pressurized gaseous fluid can be flowed into said communication conduit and the pressure therein checked, yet said pressurized fluid will bleed off only at a trickle even if said smaller conduit with its said at least means for connecting with said testing device should develop a leak.

2. The combination of claim 1 wherein said passageway is substantially cylindrical, is drilled interiorly of said seat and longitudinally through said poppet and in communication with fluid flow passageways on both sides thereof; and said insert is a substantially cylindrical wire that is inserted within said passageway.

3. The combination of claim 2 wherein said passageway is that drilled with a number 55 bit and said wire inserted therewithin is a number 16 copper wire that is flattened on each end for retention in place.

4. The combination of claim 1 wherein said insert so closely fits said passageway that it provides an annular clearance in the range of 0.0005–0.0007 inch, inclusive.

5. In a combination including:
   a. a communication conduit having a pressurized gaseous fluid therewithin; and
   b. a smaller conduit sealingly connected with and communicating with the interior of said communication conduit; said smaller conduit having at least means for connecting with a test device for testing the pressure of said fluid; the improvement comprising:
   c. a controlled flow check valve connected serially and sealingly with said smaller conduit and sealingly with and near said communications conduit; said controlled flow check valve including:
      i. full low passages with a poppet and seat means for allowing full flow in one direction and adapted for blocking reverse flow through the full flow passages; and
      ii. a controlled flow bypass means allowing a controlled trickle reverse flow sufficient to permit testing but insufficient to bleed said pressurized fluid from said communication conduit in a short time; said bypass means comprising:
   I. a passageway communicating with the upstream and downstream sides of said poppet and seat means for conducting said fluid therebetween; and
   II. an insert disposed within said passageway; said insert so nearly filling said passageway that it only allows a flow of said fluid in the range of 0.1–0.9 cubic feet per hour under a pressure differential of about 12 pounds per square inch with the downstream side at substantially atmospheric pressure.

6. The combination of claim 5 wherein said passageway and insert are so designed and installed as to allow about 0.5 cubic feet per hour flow rate at said pressure differential.

* * * * *